United States Patent
Truax

(12) 
(10) Patent No.: US 6,578,512 B2
(45) Date of Patent: Jun. 17, 2003

(54) SURVEY MARKER

(76) Inventor: Clarence E. Truax, 520 Fairground Rd., Taylorsville, KY (US) 40071

( * ) Notice: Subject to any disclaimer, the term of this patent is extended or adjusted under 35 U.S.C. 154(b) by 0 days.

(21) Appl. No.: 09/850,218

(22) Filed: May 7, 2001

(65) Prior Publication Data

US 2001/0039913 A1 Nov. 15, 2001

Related U.S. Application Data

(60) Provisional application No. 60/202,511, filed on May 5, 2000.

(51) Int. Cl.$^7$ .............................................. G01C 15/04
(52) U.S. Cl. ......................................... 116/209; 52/103
(58) Field of Search ................... 52/103, 157; 248/530; 116/200, 209

(56) References Cited

U.S. PATENT DOCUMENTS

| | | | |
|---|---|---|---|
| 13,656 A | * 10/1855 | Randolph | 292/120 |
| 191,919 A | 6/1877 | Bonner | |
| 427,394 A | 5/1890 | Brown | |
| 1,219,454 A | * 3/1917 | Hanson | 52/103 |
| 1,558,078 A | * 10/1925 | Darby | 473/205 |
| 1,817,447 A | * 8/1931 | Simpson | 116/200 |
| 2,154,966 A | 4/1939 | Vanderveer | |
| 2,181,032 A | 11/1939 | Watkins | |
| 3,205,626 A | * 9/1965 | Attenberger | 52/103 |
| 3,321,834 A | 5/1967 | Burns | |
| 3,503,163 A | 3/1970 | Lutz | |
| 3,662,436 A | * 5/1972 | Roza | 24/115 R |
| 3,685,237 A | * 8/1972 | Johnson | 52/98 |
| 3,709,188 A | * 1/1973 | Coupar | 116/209 |
| 3,824,748 A | 7/1974 | Pichowicz | |
| D246,513 S | 11/1977 | Garneau | |
| 4,127,972 A | 12/1978 | Reimoser | |
| 4,185,424 A | 1/1980 | Streit | |
| 4,738,060 A | 4/1988 | Marthaler et al. | |
| 4,970,795 A | 11/1990 | Woodward et al. | |
| 5,088,681 A | * 2/1992 | Procaccianti et al. | 248/156 |
| 5,291,703 A | 3/1994 | Ziegler | |
| D394,221 S | 5/1998 | Truax | |
| D395,251 S | 6/1998 | Truax | |
| D395,608 S | 6/1998 | Truax | |
| D395,610 S | 6/1998 | Truax | |
| 5,771,835 A | * 6/1998 | Schneider | 116/209 |
| D399,158 S | 10/1998 | Truax | |

* cited by examiner

*Primary Examiner*—Diego Gutierrez
*Assistant Examiner*—Tania C. Courson
(74) *Attorney, Agent, or Firm*—Carrithers Law Office; David W. Carrithers

(57) ABSTRACT

A survey marker having a rod with a pointed tip and a section of auger flights at a selected location thereof spaced apart from the tip, wherein the auger flights do not extend the entire length of the rod and preferably does not extend pass the half-way mark of the rod. A head extending from a distal end of the rod opposite the point includes means for retaining a survey flag, means for engaging a drive tool, and means for alignment.

23 Claims, 2 Drawing Sheets

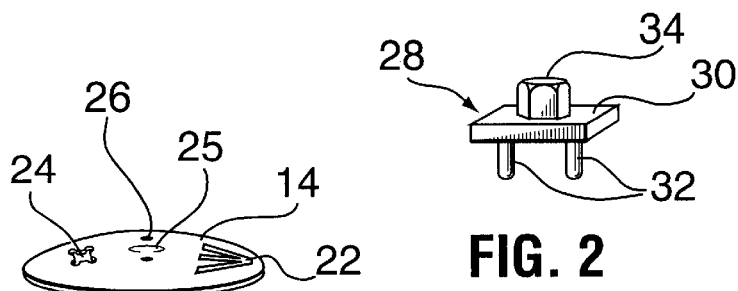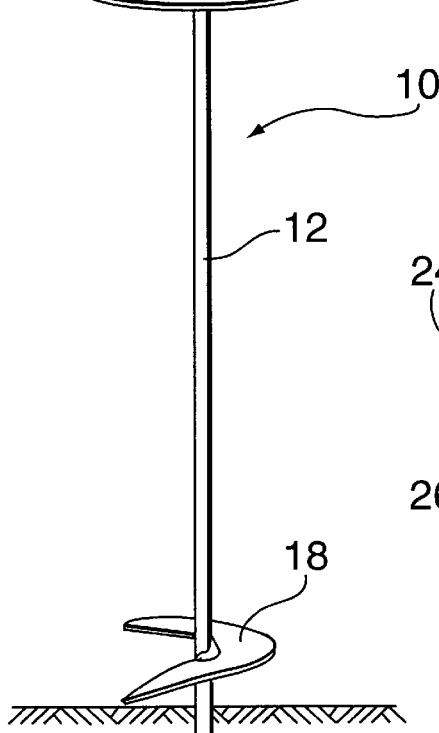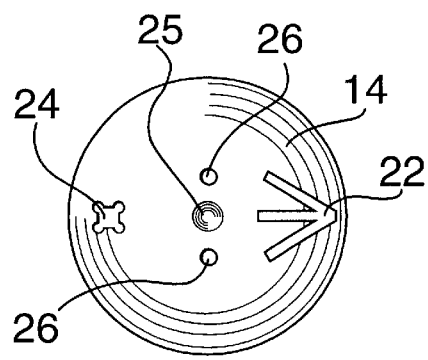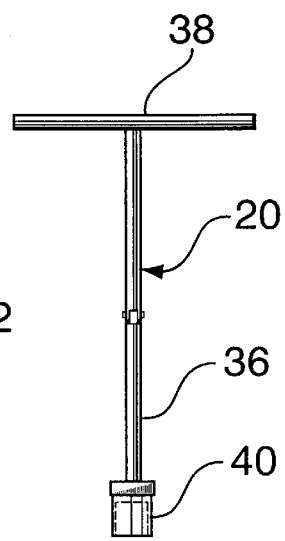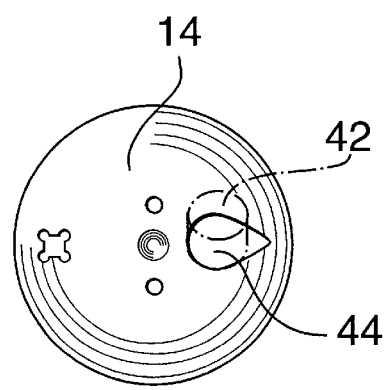
FIG. 1
FIG. 2
FIG. 3
FIG. 4
FIG. 5

SURVEY MARKER

FIELD OF THE INVENTION

This application claims the benefit of U.S. Provisional Application No. 60/202,511 filed May 5, 2000, the entire content of which is hereby incorporated by reference in this application.

DESCRIPTION OF THE PRIOR ART

Conventional survey indicators consist of plates, spikes, posts, or rods driven in, placed, or attached to natural geographic structures such as rocks or trees. Most permanent markers are formed of concrete posts or the like utilizing a plate or disk having the requisite markings and indicators affixed to or molded therein.

The surveyor usually surveys the tract of property to obtain the boundaries and uses temporary markers, such as pins or pegs having indicia or markings thereon. At a later time the surveyor or some other person must return to the numerous survey reference point cites and affix a more permanent marker at the site.

Permanent markers now used in the industry such as concrete post are heavy and difficult to carry and require a vehicle to transport them to the marker sites. Sometimes the vehicles cannot be driven close to the marker site and the difficult and time consuming task falls upon the surveying team to move the marker to the site. Moreover, these concrete markers are dangerous to walk around or over, or to mow over once vegetation such as grass crops or weeds hide them over time.

None of the above known types of survey markers, taken either singly or in combination, is seen to describe the instant invention as claimed in the instant application.

SUMMARY OF THE INVENTION

The present invention achieves the above objects by providing a survey marker having a body formed of a rod having a pointed tip with a section including a short segment of auger flights and having a generally flat or convex shaped head with indicia thereon extending from the distal end of the rod head connected thereto including a means for cooperatively engaging a device for rotating and driving the survey marker into the ground. The head also includes means for removably attaching a survey marker peg and permanently attaching an indicator or locator rod thereto.

More particularly, a preferred embodiment of the survey marker of the present invention includes a rod having a pointed tip and a section of auger flights at a selected location thereof spaced apart from the tip, wherein the auger flights do not extend the entire length of the rod and preferably does not extend pass the half-way mark of the rod. A head extending from a distal end of the rod opposite the point includes means for retaining a survey flag, means for engaging a drive tool, and means for alignment.

Accordingly, one object of the present invention is to provide a permanent survey marker which is light enough to be carried with the surveyor on the initial survey and placed into the ground to form a permanent survey marker.

Another object of the present invention is to incorporate a directional indicator on the survey marker and optionally to provide indicia or stamped markings indicating north, south, east, west and/or hash marks and/or degrees.

Another object of the present invention is to provide a metal or plastic disk such as a washer or the like to fit around the periphery of the marker and be attached thereto providing indicia or stamped markings indicating north, south, east, west and/or hash marks and/or degrees.

Another object of the present invention is to provide a metal or plastic disk such as a plate having a center hole therein for disposing the rod body, wherein the outer edge of the plate extends outwardly past the periphery of the head including means for locking the plate in place to the head wherein the plate can provide indicia or stamped markings indicating north, south, east, west and/or hash marks and/or degrees.

Another object of the present invention is to provide a survey marker driving means consisting of a rod having a first end with a means of attaching to the survey marker head or mounting thereto and having a handle formed by a cross member attached to the opposing end of the driving means.

It is another object of the present invention to provide a driving means having a rod or shank long enough to permit the user to place the survey marker rotatively in the ground without having to kneel on the ground.

It is another object of the present invention to provide a driving means which optionally includes a shaft which is telescoping or extendible which can be locked into the telescoping position by pins, spring loaded tabs and slot arrangements, or by a rotating frictional locking mechanism.

It is another object of the present invention to provide a survey marker having a generally smooth head whereby it can be walked over or mowed over without tripping or injuring the person or damaging the vehicle.

It is another object of the present invention to provide a convex plate shaped head for the survey marker forming a dome.

It is another object of the present invention to fabricate the survey marker from stainless steel, brass, aluminum, fiberglass, or graphite composite material to prevent corrosion and promote longtivity.

It is another object of the present invention to utilize plastic or fiberglass permanent locating rods up to three feet in length for extending from the top of the survey marker when used for farm land, large lots, and subdivision lots which can be cut off before sod, straw, or seeding goes down.

These and other objects of the present invention will become readily apparent upon further review of the following specification and drawings.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a perspective view of the invention in extended position, showing the tip of the rod penetrating the ground, and the auger flight in contact with the surface of the ground;

FIG. 2 is a perspective view of an insertion tool for providing cooperative engagement between the survey head and driving tool;

FIG. 3 is a top plan view of the survey marker head;

FIG. 4 is an elevational view of the driving tool for connecting with the insertion tool and rotating and driving the survey marker rod into the ground;

FIG. 5 is a plan top view of the head of an alternate embodiment having an alignment arrow forming a conical shape and showing a survey cap as a cylindrical member wedged into the alignment arrow void;

DESCRIPTION OF THE PREFERRED EMBODIMENT

Figure 6:
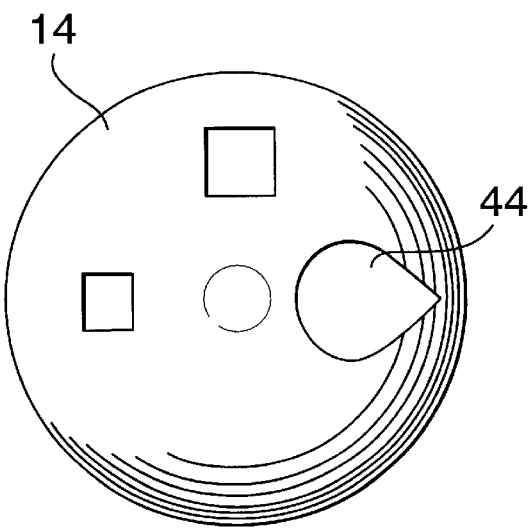
FIG. 6 is another preferred embodiment showing the head including an drop shaped arrow aperture disposed on one side of the central positioning dimple, showing a square rod aperture opposite thereof, and a square aperture on the side thereinbetween for engaging a rotating tool.

The survey marker 10 of the present invention as shown in A FIG. 1 includes a longitudinal rod 12 for anchoring the survey marker 10 in the earth, and a head portion 14 serving as an indicator source. More particularly, the rod 12 includes a pointed tip 16; however, it is contemplated that a tip having a screw, flat tip, chisel tip, or other cutting edge may be utilized to enhance penetrability of the tip 16 in a hard substrate. The rod 12 of the preferred embodiment includes a short section of auger of large diameter auger flights 18 located near, but not extending to the point 16, and not extending all of the way up to the head 14. Preferably the flights 18 stop before the half-way point of the rod. The flights 18 aid in pulling the rod 12 into the ground upon rotation by the driving tool 20.

The head 14 attached to the distal end of the rod 12 is generally convex in shape forming a plate having a center point an side edges curving downward therefrom. It is contemplated the head could be formed in a particular shape and/or be flat; however, the preferred embodiment is shown in FIG. 1. The head 14 may be a thin metal plate having a curved bottom surface or be solid having a flat bottom surface. Indicia may be printed upon the top surface of the head or on a disk (80), such as a washer or plate attached to the outer edge of the head or have a central hole therein for extending the rod 12 there through. The washer or plate would have a larger diameter than the head in order for the indicia consisting of hash marks, degrees, north, south, east, west markings or the like to be shown around the periphery of the head 14. Furthermore, the preferred embodiment includes an alignment arrow 22 and a survey flag rod (70) (locator) retaining hole 24. The survey flag may be held by a long rod composed of plastic or fiberglass. The retaining hole 24 shown in FIG. 3 is 'X' shaped in order for the rod to be inserted therethrough and twisted to hold the rod 12 in place in a permanent manner. Moreover the head 14 includes a central dimple 25, hole, or depression for locating and aligning the surveying instrument (90).

A means for rotating the survey marker 10 consists of a pair of holes 26 formed through the top of the head 14 for cooperatively engaging an insertion tool 28 having a flat base 30 with a pair of spaced apart aligned pegs 32 for cooperatively engaging the holes 26. A drive nut 34 or other means of attachment, interlocking, or cooperatively engaging a means for driving such as a drive tool 20 is attached to the top of the flat base 30.

The drive tool of the present invention includes a longitudinal member 36 connecting to a means for rotating such as a handle 38 formed by a short rod or bar extending normal to the longitudinal member 36 intersecting the midpoint thereof. A means 40 for cooperatively engaging the drive nut 34 of the insertion tool 28 such as a socket 40 extends from the distal end of the drive tool opposite the handle 38. Moreover, the drive tool 20 may have hinged segments, or utilize telescoping sections held into position with spring loaded tabs and slots, pins and slots, or frictional twist holing means, so that the drive tool 40 is collapsible. Finally different types of means of driving can be utilized with or instead of the socket 40.

It is contemplated that the drive nut 34 or other means of cooperatively engaging the drive tool 20 could be formed or attached to the head 14 and be integral with. Also a strong arm, tire tool, socket wrench with extension or any other tool could be used to engage and rotate the drive nut of the insertion tool.

As best shown in FIGS. 5–8, the alignment arrow may be formed as round alignment arrow aperture hole 42 for cooperative engagement with a tear shaped indicator stopper or cap 44, or the aperture 42 may be formed in a tear shape. A rubber stopper or survey cap 44 may be driven or screwed into the alignment arrow aperture 42 or other aperture providing a means for holding such as best shown in FIG. 5, and indicia may be included thereon.

Figure 7:
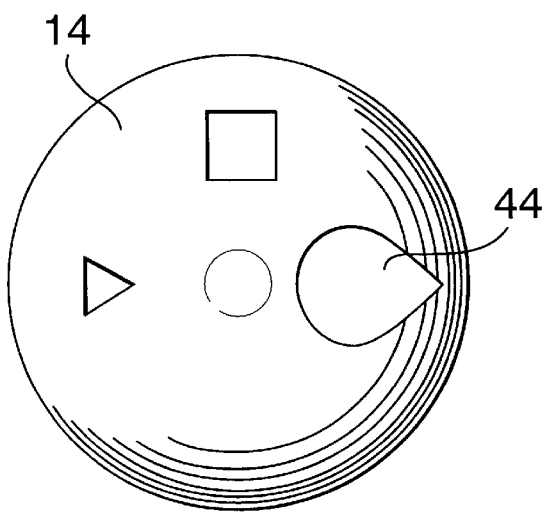
FIG. 7 is another preferred embodiment showing the head including an drop shaped arrow aperture disposed on one side of the central positioning dimple, showing a triangular rod aperture opposite thereof, and a square aperture on the side thereinbetween for engaging a rotating tool.
Figure 8:
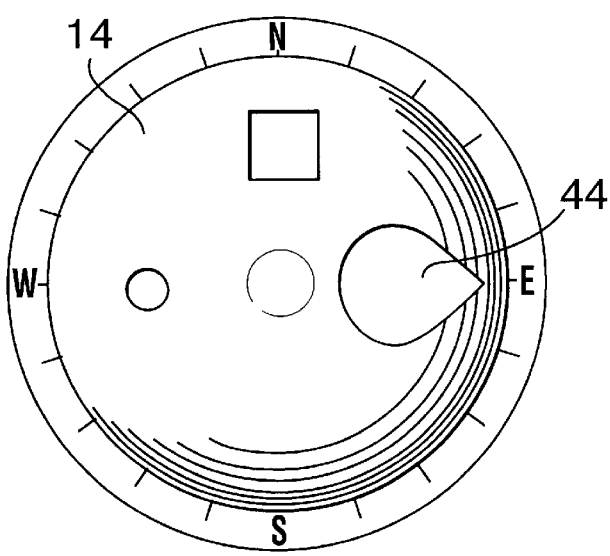
FIG. 8 is another preferred embodiment showing the head including an drop shaped arrow aperture disposed on one side of the central positioning dimple, showing a round rod aperture opposite thereof and a square aperture on the side thereinbetween for engaging a rotating tool.
Figure 9:
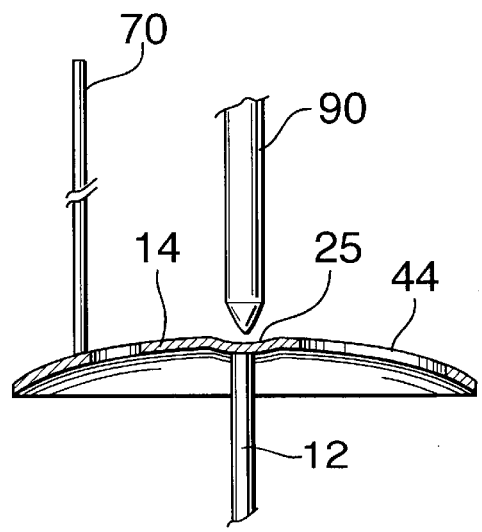
FIG. 9 is a sectional view of FIG. 1 showing the lower concave surface of the head.

FIGS. 6–8 utilize a ratchet aperture 46 providing a square hole for cooperative engagement with the square male end of a ratchet or strong arm or extension shaft connected thereto in order to rotate the survey marker 10 and screw the flights 18 of the rod 12 into the ground. As shown in FIG. 6, the head 14 includes a drop shaped arrow aperture 44 disposed on one side of the central positioning dimple 25, showing a square rod aperture 24 opposite thereof, and a square aperture on the side thereinbetween for engaging a rotating tool. As illustrated in FIG. 7, the head 14 includes a drop shaped arrow aperture 44 disposed on one side of the central positioning dimple 25, showing a triangular rod aperture 24 opposite thereof, and a square aperture on the side thereinbetween for engaging a rotating tool. FIG. 8 shows the head 14 including an drop shaped arrow aperture 44 disposed on one side of the central positioning dimple 25, showing a round rod aperture 24 opposite thereof and a square aperture 46 on the side thereinbetween for engaging a rotating tool.

Although the ratchet aperture 46 is offset from the center of the head 14, it is disposed at a position which still allows the rotation of the head 14 with a ratchet or other driving means. Of course, the central positioning dimple 25 can be shaped to cooperatively engage a driving means, such as the square shaft of an extension tool or be formed as a slit or slot for connecting with other driving tools. The dimple 25 can also be cut through the head creating an aperture therethrough to accommodate a driving means or be threaded for engaging a bolt having an engageable head.

To use the survey marker, simply push or pres the rod 12 of the survey marker 10 into the ground until the auger flight 18 makes contact with the surface of the ground. Rotate the survey marker 10 using the drive means, whether it be the 'T-tool' and insertion tool for mounting within the head apertures, insertion of the distal end of a male longitudinal member of a strong arm or ratchet, or extension shaft extending therefrom cooperatively engaging the ratchet aperture 46. The alignment arrow 22 or alignment aperture 44 are oriented to point in the direction of the next survey marker 10. Once the survey marker 10 has been aligned, the insertion tool 28, ratchet, strong arm, or other means for rotation are removed and the survey flag rod can be inserted into the retaining hole 24. After the surveying has been completed the flag pole is cut or broken off at ground level. The survey marker 10 remains as a permanent marker.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

I claim:

1. A survey marker, comprising:
    a head comprising a convex upper surface and a concave lower surface, said head including a first aperture comprising means for aligning said head in a selected direction, means within said head for engaging a drive tool for rotating said head and rod, means for positioning a surveying instrument, and an aperture for retaining a survey rod therein; and
    a rod affixed to said center of said concave lower surface of said head, said rod having a pointed tip and at least one section of auger flights at a selected location thereon spaced apart from said tip and spaced apart from said head.

2. The survey marker of claim 1, wherein said flight extends around said rod 360 degrees.

3. The survey marker of claim 1, wherein a front edge of said flight is spaced apart from and in vertical alignment with a rear edge of said flight.

4. The survey marker of claim 1, wherein said flight has an inner edge connecting to said rod and said rear edge of said flight extends outwardly from said rod normal thereto and said front end of said flight extends downwardly at a selected angle.

5. The survey marker of claim 1, wherein said aperture for retaining said survey rod therein comprises a triangular aperture.

6. The survey marker of claim 1, wherein said aperture for retaining said survey rod therein comprises a round aperture.

7. The survey marker of claim 1, wherein said means for engaging said drive tool for rotating said head is a square aperture.

8. The survey marker of claim 1, wherein said means for engaging said drive tool is offset from the center of said head.

9. The survey marker of claim 1, wherein said means for positioning said surveying instrument comprising a central positioning dimple.

10. The survey marker of claim 1, wherein said means for aligning comprising a drop shaped aperture.

11. The survey marker of claim 1, wherein said means for aligning comprising a slotted arrow.

12. The survey marker of claim 1, wherein said auger flights extend along a selected portion of said rod.

13. The survey marker of claim 1, wherein said auger flights are spaced apart from said head and said tip of said rod.

14. The survey marker of claim 1, wherein said head includes markings or indicia selected from the group consisting of letters, words, hash marks and degrees.

15. The survey marker of claim 1, said head including a disk corporately engaging said head extending around the periphery thereof including markings and indicia thereon.

16. The survey marker of claim 1, including a disk having a center hole for receiving said rod, wherein an outer edge of said disk extends outwardly past the periphery of the head.

17. The survey marker of claim 1, including means for retaining a disk at a selected position with respect to said head.

18. The survey marker of claim 1, including a driving means.

19. The survey marker of claim 1, wherein said head includes a drive nut corporately engaging said means for engaging drive means.

20. The survey marker of claim 1, wherein said driving means includes a telescoping shaft.

21. The survey marker of claim 1, including a locating rod for extending from the top of said head.

22. The survey marker of claim 1, wherein said head and said rod are fabricated from material comprising stainless steel, brass, aluminum, fiber glass, graphite material, and combinations thereof.

23. A method of using and marking a survey comprising the steps of:
    selecting a survey marker including a head comprising a convex upper surface, said head including a first aperture comprising means for aligning said head in a selected direction, means within said head for engaging a drive tool for rotating said head and rod, means for positioning a surveying instrument, and an aperture for retaining a survey rod therein; and a rod affixed to said center of a concave lower surface of said head, said rod having a pointed tip and at least one section of auger flights at a selected location thereon spaced apart from said tip and spaced apart from said head;
    pushing said rod of said survey marker into the ground until said auger flight makes contact with the surface of the ground;
    engaging said means for engaging said drive tool with an insertion tool;
    rotating said survey marker using said drive tool forcing said flights and said rod into the ground;
    stopping said rotation of said survey marker at a selected position, orienting said means for alignment to point in the direction of another selected survey marker;
    removing said drive means from said means for engaging;
    inserting a survey flag rod into said aperture; and
    after the surveying has been completed cutting said flag rod off at ground level leaving said survey marker as a permanent marker.

* * * * *